April 8, 1941.    H. C. FRENTZEL, JR., ET AL    2,237,345
RECEPTACLE TRANSFER MECHANISM
Filed June 26, 1939
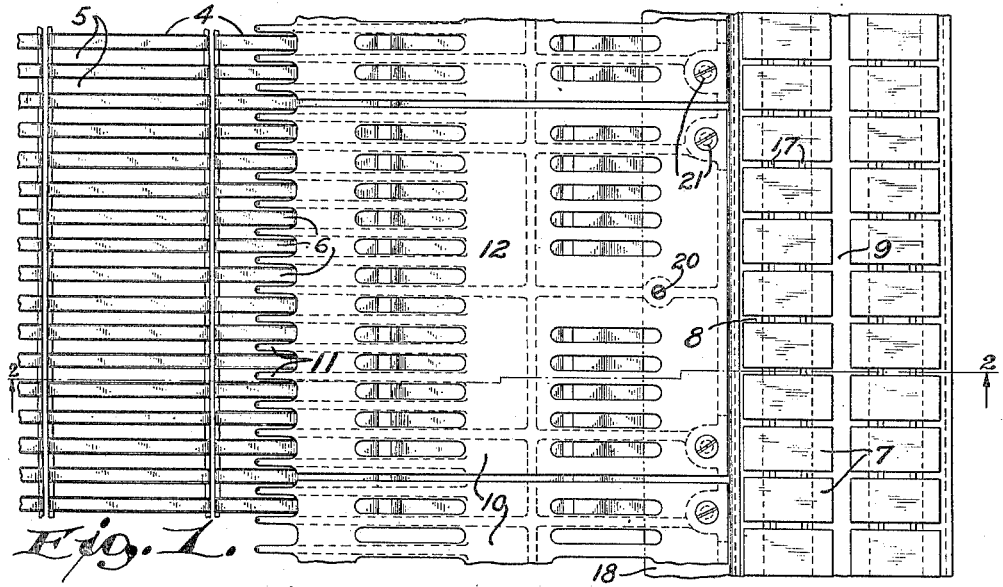
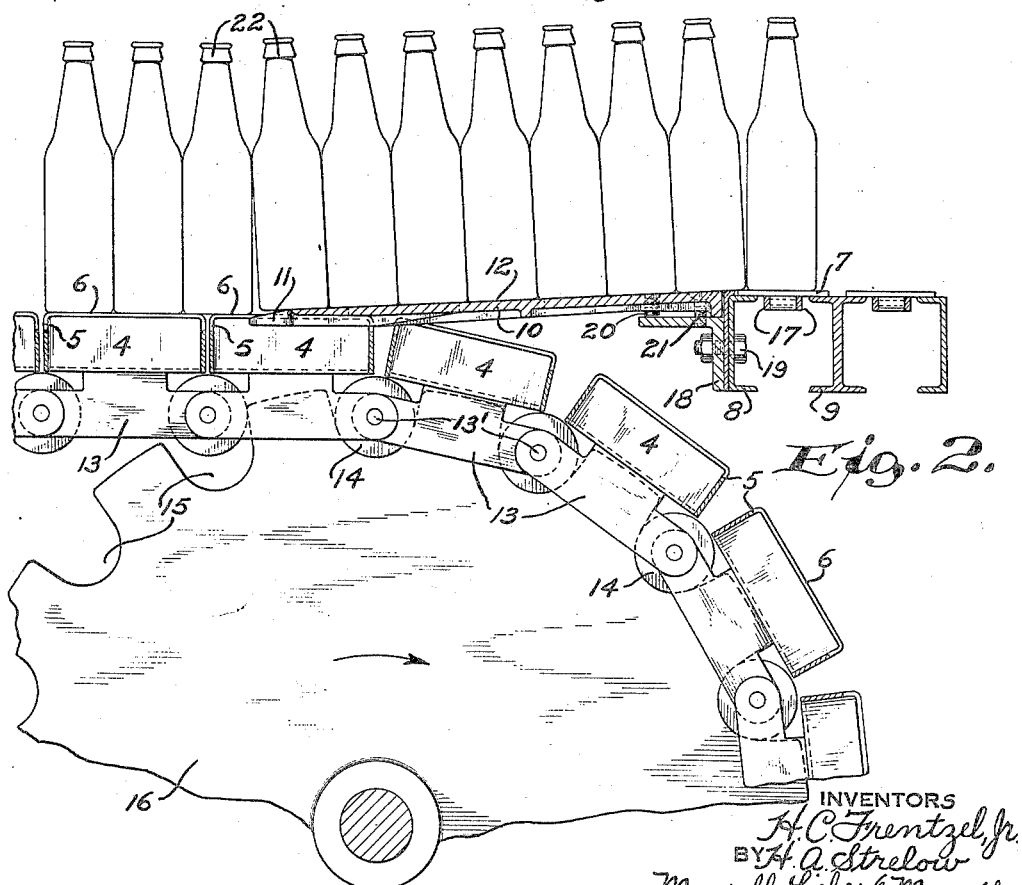

Patented Apr. 8, 1941

2,237,345

UNITED STATES PATENT OFFICE 2,237,345

RECEPTACLE TRANSFER MECHANISM

Herman C. Frentzel, Jr., Shorewood, and Henry A. Strelow, Milwaukee, Wis., assignors to The Heil Co., Milwaukee, Wis., a corporation of Wisconsin Application June 26, 1939, Serial No. 281,078

2 Claims. (Cl. 198—20)

Our present invention relates in general to improvements in the art of transferring objects from place to place, and relates more specifically to improvements in the construction and operation of mechanism for facilitating the transfer of receptacles from one conveyor to another.

Generally defined, an object of our invention is to provide simple, compact and efficient mechanism for effecting transfer of receptacles from one conveyor to another.

In many industries, such as the brewing industry, it is frequently desirable to transfer a constantly advancing group of receptacles such as relatively tall upright beer laden cans or bottles traveling en masse through a pasteurizer or the like, to a discharge support or plate, and from thence in single file formation to another constantly advancing conveyor traveling transversely of the direction of advancement of the receptacles through the pasteurizer. Because of the height of the liquid laden receptacles, the transportation thereof has heretofore preferably been accomplished in an approximately horizontal plane in order to avoid tipping of the cans or bottles, although considerable tilting of these receptacles is in fact possible before actual tipping thereof will take place. While it has heretofore been proposed to provide a main conveyor for transporting the receptacles en masse toward a horizontal stationary plate having finger-like projections riding in parallel grooves in the successive links of the main conveyor in order to gently transfer such receptacles to a final discharge conveyor moving transversely of the path of the primary conveyor, it was difficult to support this stationary horizontal plate and it was also necessary to utilize relatively long and frail transfer fingers associated with this plate, thus making these prior transfer mechanisms relatively unsatisfactory.

It is therefore a more specific object of the present invention to provide a receptacle transfer mechanism of the type utilizing one or more fingered stationary plates to effect transfer of the objects from one conveyor to the other, wherein the plate is not horizontal but is inclined sufficiently to permit more thorough supporting thereof while also enabling the use of relatively stubby and rigid transfer fingers.

Another specific object of this invention is to provide an improved transfer assemblage for relatively tall bodies wherein the final discharge conveyor may be located closely adjacent to the bend at the delivery end of a main endless conveyor, and in which the fixed transfer plate or plates located between the two conveyors may be made relatively short and firmly supported.

A further specific object of the present invention is to provide improved mechanism for automatically transferring receptacles such as cans or bottles from one conveyor whereon the receptacles are travelling en masse, to another conveyor travelling transversely of the direction of advancement of the primary conveyor and upon which the objects are conveyed singly or in single file rows.

Still another object of our invention is to provide improved receptacle transfer mechanism which is adapted to effectively remove relatively tall receptacles from a constantly advancing conveyor, without undesirably tipping, jarring, or damaging the transferred objects.

These and other objects and advantages of our invention will be apparent from the following description.

A clear conception of an embodiment of the features constituting the present improvement, and of the construction and operation of a receptacle transfer mechanism built in accordance with the invention, may be had by referring to the drawing accompanying and forming a part of this specification wherein like reference characters designate the same or similar parts in the various views.

Fig. 1 is a fragmentary top view of a portion of one of our improved receptacle transfer mechanisms; and Fig. 2 is a fragmentary section through the assemblage of Fig. 1, taken along the line 2—2.

While our invention has been illustrated and described herein as being utilized especially for the purpose of transferring relatively tall liquid laden bottles from a relatively wide primary conveyor to a single row final conveyor, it is not the intent to thereby unnecessarily restrict the scope.

Referring to the drawing, the improved receptacle transfer mechanism shown therein comprises in general a relatively wide main conveyor having a series of interconnected long parallel laterally advancing bars 4 provided with transverse parallel slots or recesses 5 separated by intervening platforms or carrier projections 6; a secondary or final discharge conveyor having a series of interconnected slats or plates 7 movable along fixed supporting rails 8, 9 in a direction transversely of the direction of advancement of and spaced from the main conveyor; and one or more normally fixed transfer supports or plates 10 having projections or fingers 11 extending into and riding along the recesses 5 of the advancing bars 4 and being provided with inclined upper transfer surfaces 12 spanning the gap between the main and final conveyors.

The slats or bars 4 of the main conveyor may be formed of sheet metal and are provided with carrier links 13 which are articulably interconnected by pivot pins 13' having rollers 14 journaled thereon. The successive rollers 14 are cooperable with the peripheral notches 15 of supporting and driving sprockets 16, and the main conveyor is obviously bent around these sprockets 16 as illustrated in Fig. 2, during normal operation of the mechanism. The plates 7 of the auxiliary or final conveyor may also be articulably interconnected by links 17 and pins in a well known manner, and are continuously movable along the rails 8, 9 and across the path of the main conveyor in either direction. A second auxiliary conveyor of the same general type movable in either direction across the path of the main conveyor, as shown in Figs. 1 and 2, may also be provided, but this second discharge conveyor is not essential.

The inclined supporting plates 10 may be formed as a single unit in cases where the main conveyor is relatively narrow; but when the main conveyor is wide, it is preferable to form the fixed support in sections. All of the inclined plates 10 are suspended at their upper discharge ends from an angle bar 18 which is firmly attached to the fixed conveyor rail 8 by bolts 19. The plates 10 are preferably provided with leveling set screws 20 for adjustably positioning the fingers 11 relative to the recesses 5, and for also positioning the extreme delivery ends thereof relative to the conveyor plates 7; and the plates 10 are finally clamped in adjusted position by means of retaining screws 21. When finally positioned and attached to the bar 18, the upper inclined transfer surface 12 of the plates 10 provides a gradually sloping transition plane over which the receptacles or bottles 22 are transported from the main conveyor to the final discharge conveyor, and the portions of the plates 10 nearest the fingers 11 may rest upon the projections 6 of the successive bars 4 as these bars approach the sprockets 16, as illustrated in Fig. 2.

During normal operation of the improved receptacle transfer mechanism, the sprockets 16 are rotating in the direction indicated by the arrow in Fig. 2, and the bottles 22 are being transported en masse by the main conveyor bars 12 toward the fingered ends of the fixed transfer plates 10. As the upright bottles 22 approach the fingers 11 at the lower end of the plate 10, they are transferred from the upper surfaces of the main conveyor projections 6 onto and over the fingers 11 and upon the upwardly inclined surface 12 of the plates 10. The subsequent bottles 22 which are thus pushed over the fingers 11 and onto the surface 12, will cause the bottles 22 which have previously been disposed upon the lower portion of this inclined surface, to move upwardly therealong. The bottles 22 are thus maintained in stable condition during transference, and are eventually delivered in rows upon the transversely moving final discharge conveyor, being gradually removed from the mass of bottles by the plates 7 of this conveyor. In this manner the successive bottles 22 are automatically and gently removed from the main conveyor bars 4, and after being pushed upwardly along the inclined surface 12 of the plates 10, the bottles are eventually discharged in rows by the auxiliary conveyor. The inclination of the surface 12 may be considerable, in spite of the fact that the bottles 22 are relatively tall, but should not be so steep that the centers of gravity of the successive bottles will be outside of the bases of these bottles when they are tilted.

From the foregoing detailed description it will be apparent that the improved receptacle transfer mechanism while being simple and compact in construction, permits gradual transfer of the successive receptacles or bottles from a main conveyor whereon the bottles are positioned en masse, to an auxiliary or final conveyor whereon the bottles travel individually or in rows. The inclination of the plates 10 permits the use of relatively short plates, while also permitting the provision of a firm support for these plates located closely adjacent to the bend of the main conveyor. The inclined receptacle receiving surfaces 12 will also permit the use of shorter fingers 11 and will enable these fingers to more gradually transfer the bottles from the main conveyor to the plate 10, than if the surface 12 were horizontal or oppositely inclined. It is obviously desirable in order to minimize the friction, to have the plates 10 as short as possible, and the inclination thereof upwardly and away from the main conveyor will obviously permit reduction of the length of these plates to a minimum. The adjustability afforded by the set screws 20 also permits perfect alinement of the plates 10 with the conveyor decks and with each other, and the overhanging ends of the plates may rest upon the upper surfaces of the projection 6 of the bars 4, without producing undesirable jamming and without obstructing the movement of the main conveyor. The present improvement has proven highly successful in actual commercial use, especially as applied to the delivery end of a pasteurizer for bottled beer, and the assemblage is obviously extremely simple and devoid of parts which are apt to become inoperative.

It should be understood that it is not desired to limit this invention to the exact details of construction or to the precise mode of use, herein shown and described, for various modifications within the scope of the claims may occur to persons skilled in the art.

We claim:

1. In combination, a main conveyor having a downward bend at its discharge end and being provided with parallel recesses extending in the direction of travel thereof, an auxiliary conveyor movable across and above the path of said main conveyor adjacent to said bend, a stationary receptacle transfer plate connecting said conveyors and having fingers at its lower end riding in said recesses, and a jack screw cooperating with a clamping screw at the upper end of said plate adjacent to said auxiliary conveyor for varying the inclination of said plate and for aligning said plate end with said auxiliary conveyor.

2. In combination, a main conveyor having a downward bend at its discharge end and being provided with parallel recesses extending in the direction of travel thereof, an auxiliary conveyor movable across and above the path of said main conveyor adjacent to said bend, a stationary receptacle transfer plate connecting said conveyors and having fingers at its lower end riding in said recesses, the transfer surface of said plate being rectilinear and gradually inclined from the discharge ends of said fingers to the extreme upper discharge end of said plate, and a jack screw cooperating with a clamping screw at the upper end of said plate adjacent to said auxiliary conveyor for varying the inclination of said plate and for alining said plate end with said auxiliary conveyor.

HERMAN C. FRENTZEL, Jr.
HENRY A. STRELOW.